(12) United States Patent
Disher (10) Patent No.: US 12,065,339 B2
(45) Date of Patent: Aug. 20, 2024

(54) LIFTING SYSTEM (71) Applicant: Liftco, Inc., Elkhart, IN (US)

(72) Inventor: John C. Disher, Elkhart, IN (US)

(73) Assignee: LIFTCO, INC., Elkhart, IN (US)

( * ) Notice: Subject to any disclaimer, the term of this patent is extended or adjusted under 35 U.S.C. 154(b) by 260 days.

(21) Appl. No.: 17/653,199

(22) Filed: Mar. 2, 2022

(65) Prior Publication Data

US 2022/0289536 A1    Sep. 15, 2022

Related U.S. Application Data

(60) Provisional application No. 63/160,323, filed on Mar. 12, 2021.

(51) Int. Cl.
*B66F 7/06* (2006.01)
*B66F 7/28* (2006.01)

(52) U.S. Cl.
CPC .............. *B66F 7/0616* (2013.01); *B66F 7/28* (2013.01)

(58) Field of Classification Search
CPC .................................. B66F 7/0616; B66F 7/28
USPC ..................................... 108/145, 152, 47, 42
See application file for complete search history.

(56) References Cited

U.S. PATENT DOCUMENTS

| | | | | | |
|---|---|---|---|---|---|
| 1,624,862 | A | * | 4/1927 | Elliot ............................. | 108/47 |
| 2,774,640 | A | * | 12/1956 | Harmon ................ | B60N 3/004 |
| | | | | | 108/134 |
| 2,916,339 | A | * | 12/1959 | Zobac ...................... | A47B 5/04 |
| | | | | | 108/134 |
| 3,026,158 | A | * | 3/1962 | Freeman .................. | A47B 5/04 |
| | | | | | 108/134 |
| 4,791,873 | A | * | 12/1988 | Towfigh ................... | A47B 5/04 |
| | | | | | 108/134 |
| 4,998,484 | A | * | 3/1991 | Groetzinger ............. | A47B 5/04 |
| | | | | | 108/115 |
| 5,240,215 | A | * | 8/1993 | Moore ............... | F16M 11/2021 |
| | | | | | 108/10 |
| 5,381,738 | A | * | 1/1995 | Meyer ...................... | A47B 5/00 |
| | | | | | 108/42 |
| 5,775,655 | A | * | 7/1998 | Schmeets ................. | A47B 5/00 |
| | | | | | 108/115 |

(Continued)

FOREIGN PATENT DOCUMENTS

GB        2135867 A  *  9/1984  .............. A47B 5/04

*Primary Examiner* — Jose V Chen
(74) *Attorney, Agent, or Firm* — Botkin & Hall, LLP; Michael D. Marston, Esq.

(57) ABSTRACT

A lifting system for lifting a lifting platform through use of a lifting assembly. The lifting assembly having a vertical support rail and a control arm that is pivotally connected to the vertical support rail about a first pivot axis. A support beam being connected to the lifting platform the support beam having an engaging member near its proximal end that engages the vertical support rail to provide translational movement of the support beam along the vertical support rail. The control arm having an engaging member engaging the support beam at a location spaced from the vertical support rail to provide translational movement of the engaging member with respect to the support beam. A stabilizer arm is pivotally connected to the control arm and pivotally near the proximal end of the support beam. Movement of the lifting platform causing translational movement of the engagement members.

18 Claims, 9 Drawing Sheets

(56) References Cited

U.S. PATENT DOCUMENTS

| | | | | |
|---|---|---|---|---|
| 5,823,120 A * | 10/1998 | Holmquist | ............... | A47B 9/02 108/147 |
| 6,026,752 A * | 2/2000 | Zachrai | ............... | A47B 46/005 100/42 |
| 6,038,986 A * | 3/2000 | Ransil | .................... | A47B 17/02 108/146 |
| 7,658,153 B1 * | 2/2010 | Patoka | .................... | B60R 11/00 108/46 |
| 8,065,966 B1 * | 11/2011 | Bacon | .................... | A47B 9/16 108/147 |
| 8,100,488 B2 * | 1/2012 | Eisele | .................... | F25D 25/02 108/106 |
| 8,800,454 B2 * | 8/2014 | Jones | ...................... | A47B 9/02 108/145 |
| 8,857,347 B1 * | 10/2014 | Liu | .......................... | A47B 5/02 108/47 |
| 10,111,518 B2 * | 10/2018 | Blackburn | ............ | A47B 21/02 |
| 11,723,455 B2 * | 8/2023 | Hoglan | ................ | A47B 13/081 108/145 |
| 2007/0034754 A1 * | 2/2007 | McKeon | ................ | A47B 9/04 248/125.2 |

\* cited by examiner

LIFTING SYSTEM

CROSS-REFERENCE TO RELATED APPLICATIONS

This application claims the benefit of the Provisional U.S. Patent Ser. No. 63/160,323, filed Mar. 12, 2021, which is incorporated herein by reference in its entirety.

BACKGROUND OF THE INVENTION

In mobile living quarters, such as trailers, campers, or recreational vehicles (RV), there is limited space. This creates a need for flexibility in the available space. In particular, accommodations for sleeping within the relatively limited space of an RV consume a significant portion of the available space in the RV when the occupants are awake and moving about the RV. As such, there is a need for comfortable sleeping accommodation that take a considerable amount of space within the RV to be stowed when not in use. Transforming the sleeping space to living space increases the usefulness of the interior of the RV without having dedicated areas. One way to accomplish flexibility is to have a platform that can be used for sleeping space to vertically adjust out of the way when not in use. Some have attempted to solve this problem with complex mechanisms that are connected and stabilized with gears, chains, cables, and the like, but these require support on all four corners. These mechanisms are subject to becoming entangled with bedding materials, causing personal injury, getting out of adjustment, or becoming jammed. Other mechanisms may be difficult to use or require the use of electricity. An improved device is needed that fully stows sleeping accommodations with a minimum of complexity.

SUMMARY OF THE INVENTION

The system of the present invention has at least one lifting assembly that is used to lift a lifting platform. The lifting assemblies have a vertical support rail that may be mounted to a wall. A control arm having a proximal end and an oppositely located distal end is pivotally connected to the vertical support rail about a first pivot axis that is near the proximal end of the control arm. The distal end of the control arm is spaced from the vertical support rail. A support beam is connected to the lifting platform. The support beam has a distal end that is located relatively far from the vertical support rail and a proximal end that is located adjacent to the vertical support rail. The proximal end of the support beam has an engaging member that is adjacent to the proximal end that is for contacting the vertical support rail to maintain translational movement of the proximal end of the support beam along the vertical support rail.

The control arm includes an engaging member that engages the support beam near the distal end of the control arm. The engaging member maintains translational movement of the distal end of the control arm with respect to the support beam. The engaging member of the control arm rides within a slot within the support beam and the engaging member of the control arm. The engaging member is movable between a first position that is located relatively far from the vertical support rail and a second position that is located relatively near the support rail.

A stabilizer arm has a distal end and a proximal end. The distal end of the stabilizer arm is pivotally connected to the control arm about a second pivot axis. The second pivot axis is between the proximal end and the distal end of the control arm. The proximal end of the stabilizer arm is pivotally connected to the support beam about a third pivot axis that is adjacent to the proximal end of the support beam. The engaging member adjacent to the proximal end of the support beam maintains a constant distance between the third pivot axis and the vertical support rail.

A spring is pivotally connected to the control arm between the second pivot axis and the distal end of the control arm and the spring is pivotally connected to the stabilizer arm. The spring has a biasing force toward extension. The spring biases the lifting platform toward the first pivot axis and spring biases the engaging member of the control arm into the first position within the slot of the support beam.

DETAILED DESCRIPTION OF INVENTION

Figure 1:
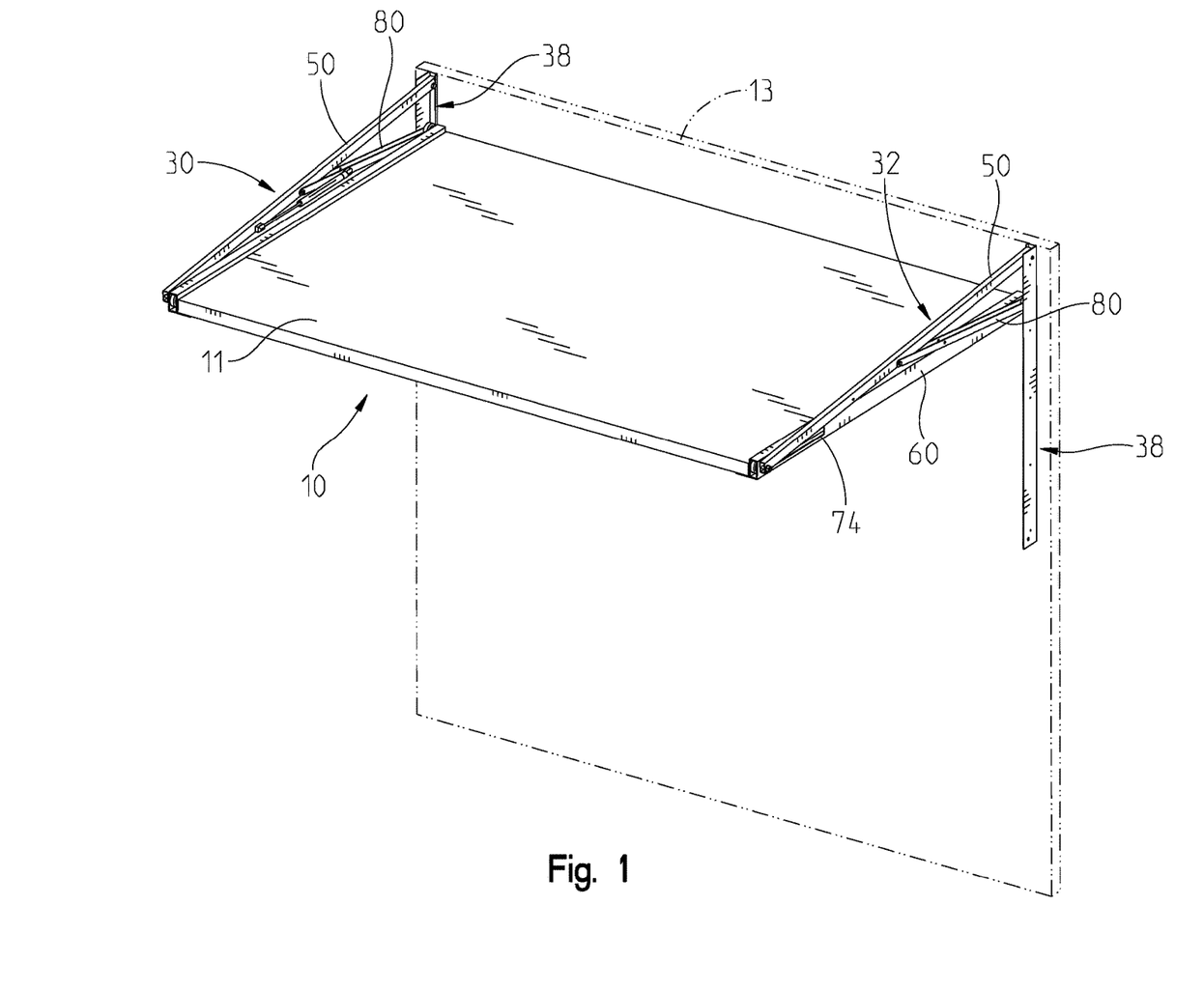
FIG. 1 is an isometric view of the lifting system in its fully raised position.

The lifting system 10 of the present invention has a lifting platform 11 that is straddled by a pair of lifting assemblies 30, 32. The left lifting assembly 30 is symmetrical with the right lifting assembly 32. FIG. 1 shows an overview of the lifting assemblies 30, 32 and the lifting platform 11 that is attached between the lifting assemblies 30, 32. As viewed in FIG. 1, the lifting system 10 is shown in its fully raised position. Each lifting assembly 30, 32 includes the same components and in some instances the components correspond to a left hand or right hand version, with those versions of the components corresponding to them being on the left hand side of the lifting platform 11 or on the right hand side of the lifting platform 11 as viewed in FIGS. 1-4. The individual components within each lifting assembly 30, 32 will be indicated with the same numbers, despite the slight variation of whether the component is used in the left lifting assembly 30 or the right lifting assembly 32. FIG. 4 shows the lifting system 10 in its fully lowered position. Each lifting assembly includes a vertical support rail 38. The vertical support rails 38 are formed from a J-shaped channel of metal having a mounting flange 42 and a guide flange 44 that are joined by a back wall 46. The vertical support rails 38 are adapted to be mounted to a wall 13 in a vertical configuration with the back wall 46 of each vertical support rail 38 contacting the wall 13 to which the lifting system 11 is mounted. The lifting platform 10 is well suited for supporting a bed in a recreational vehicle (RV) and may be used to support appliances or other objects that are desirable to be lifted and stowed when the lifting platform 11 is in the fully raised position shown in FIG. 1 and have the objects being accessible when the lifting platform 11 in the lowered position shown in FIG. 4.

Each lifting assembly 30, 32 has a control arm 50 that is made of tubular stock. The control arm 50 has a proximal end 64 and a distal end 56. The proximal end 64 is pivotally connected to the mounting flange 42 of the vertical support rail 38 with a bolt 48. The center of the bolt 48 acts as a first pivot axis 51 about which the control arm 50 pivots about with respect to the vertical support rail 38 to which the control arm 50 is attached. The distal end 56 of the control arm 50 has a bolt 54 upon which a wheel 57 rotates. The wheel 57 will have some type of bearing 59 upon which it rotates around the bolt 54 that holds it to the control arm 50. It should be noted that the wheel 57 and bolt 54 are cantilevered outwardly from the control arm 50 on an opposite side of where the control arm 50 contacts the mounting flange of the vertical support rail 38.

Each lifting assembly 30, 32 has a support beam 60 that is an extruded tubular member. Each support beam has an attachment flange 61 for attaching to the lifting platform 11 when the lifting platform 11 spans between the lifting assemblies 30, 32. The support beam 60 has a distal end 62 that is relatively far from the vertical support rail 38 and a proximal end 64 that is adjacent to the support rail 38. The proximal end 64 of the support beam 60 has a wheel 68 that is cantilevered from the support beam and the wheel 68 rides within the support rail 38 in rolling engagement. The wheel 68 rides between the mounting flange 42 and the guide flange 44 on the back wall 46 of the support rail 38. The wheel 68 rotates about bolt 70 that mounts the wheel 68 to the support beam. Each support beam 60 has an outer wall 66 that is guided to be within the guide flange 44 of the vertical rail 38 that each support beam 60 is nearest by the wheel 68 riding upon each corresponding vertical rail. Near the distal end 62 of the support beam 60, the outer wall 66 has a slot 74 having an outermost end surface 76 and an innermost end surface 78 that define the length of the slot 74. As the wheel 57 on the control arm 50 rides within the support beam 60, the bolt 54 may contact either the outermost end surface 76 or the innermost end surface of the slot 74. This limits the movement of the wheel 68 between a first position when the bolt 54 contacts the outermost end surface 76 and a second position when the bolt 54 contacts the innermost end surface end surface 78 of the slot 74. The engagement of the wheel 57 with the inside of the support beam 60 and the engagement of the bolt 54 with the slot 74 maintains translational movement of the distal end 56 of the control arm 50 with respect to the support beam 60. The wheel 57 near the proximal end 65 of each support beam 60 engages a corresponding vertical support rail 38 to maintain translational movement of the proximal end 64 of each support beam 60 along its corresponding vertical support rail 38. During translational movement of each support beam 60 its proximal end 64 is maintained at a constant distance from its corresponding support rail 38 as the wheel 68 rotates about axis 79 that corresponds to the center of bolt 70.

A stabilizer arm 80 having a distal end 84 and a proximal end 88 that is pivotally connected to each control arm 50 at a second pivot axis 92. The second pivot axis 92 corresponds the center of bolt 96. The second pivot axis 92 corresponds to the midpoint of the control arm 50. More specifically the midpoint of the control arm 50 is the midpoint between the axis 98 of bolt 57 and the first pivot axis 51. The proximal end 88 of the stabilizer arm 80 is pivotally connected to the support beam 60 about axis 79 that corresponds to the centerline of bolt 70. Axis 79 will be referred to as a third pivot axis 79 to facilitate discussion of the relationships between the components of each lifting assembly 30, 32. As the wheel 68 engages its corresponding vertical support rail 38, it maintains the third pivot axis 79 at a constant distance away from the corresponding support rail 38 throughout translational movement of the third pivot axis 79 along the corresponding vertical support rail 38.

Each lifting assembly 30, 32 has extension spring 110 having a compressed length and an extended length with a biasing force toward its extended length. The spring 110 is a gas spring and is pivotally connected between the control arm 50 and the stabilizer arm 80. Axis 118 defines a pivotal connection between the spring 110 and the control arm 50. Axis 118 on the control arm is located between the second pivot axis 92 and the distal end 56 of the control arm. Axis 122 defines a second pivotal connection between the spring 110 and the stabilizer arm 80. Axis 122 on the stabilizer arm 80 is located between the second pivot axis 92 and the third pivot axis 79. Due to the bias of the spring 110 being in an outward direction corresponding toward its own extension, that bias tends to drive pivot axes 118, and 122 apart. As such, the biasing force of the spring 110 tends to spread the distal end 56 of the control arm 50 apart from the third pivot axis 79 that is near the proximal end 64 of the support beam 60.

Figure 2:
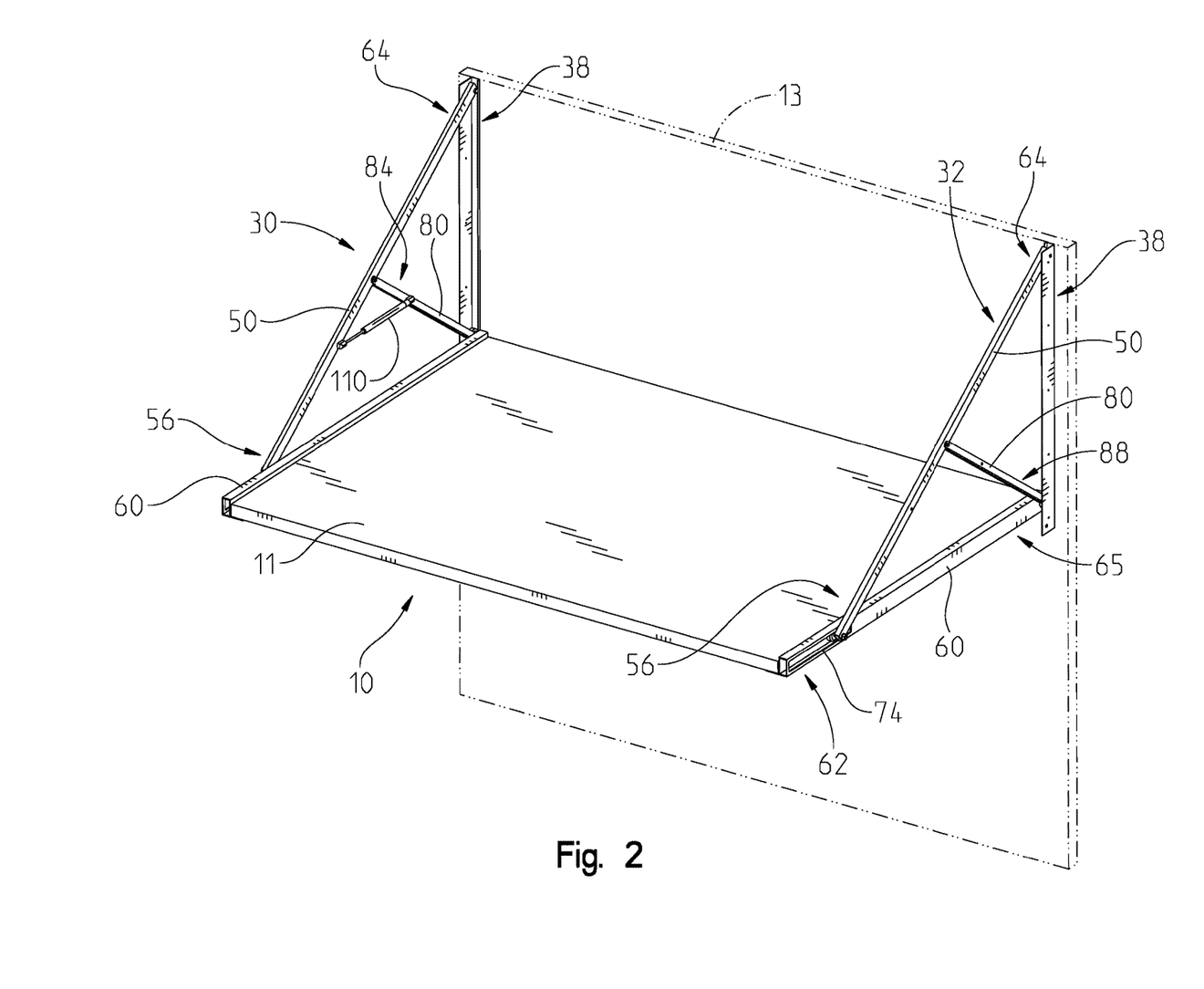
FIG. 2 is an isometric view of the lifting system shown in FIG. 1 in its fully lowered position.
Figure 3:
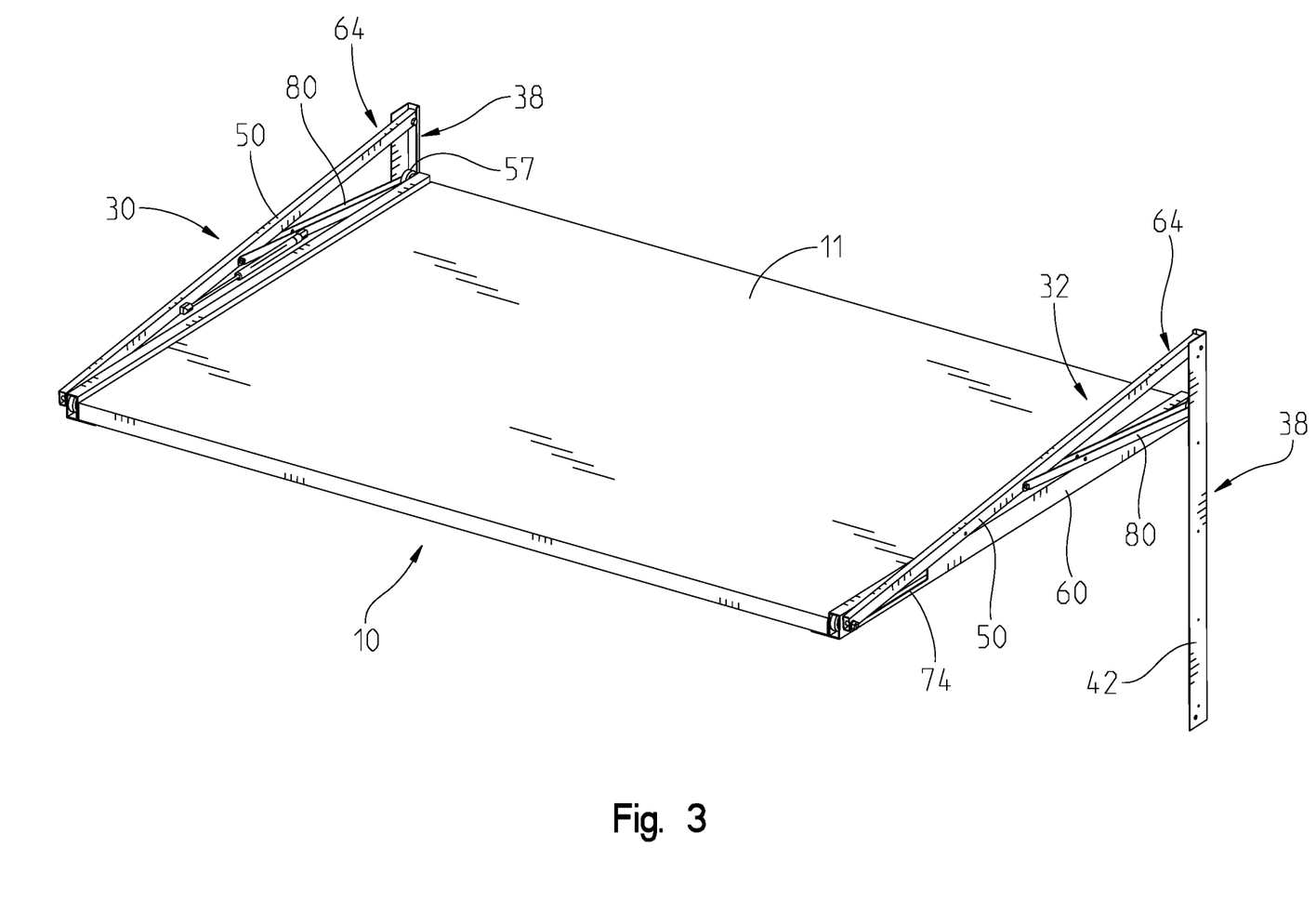
FIG. 3 is an isometric view of the lifting system shown in FIGS. 1-2 in the fully raised position.
Figure 4:
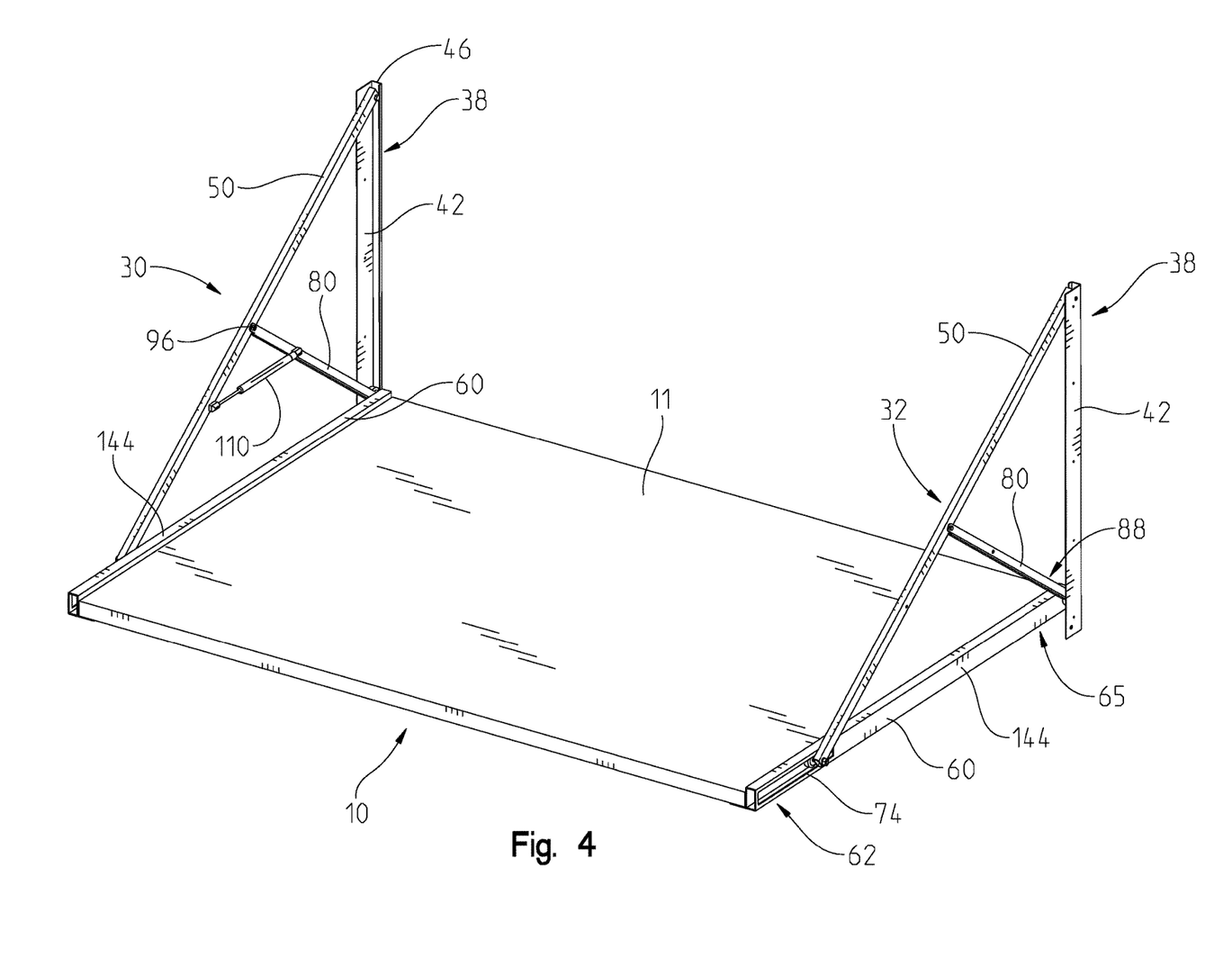
FIG. 4 is an isometric view of the lifting system shown in FIGS. 1-3 in the fully lowered position.
Figure 5:
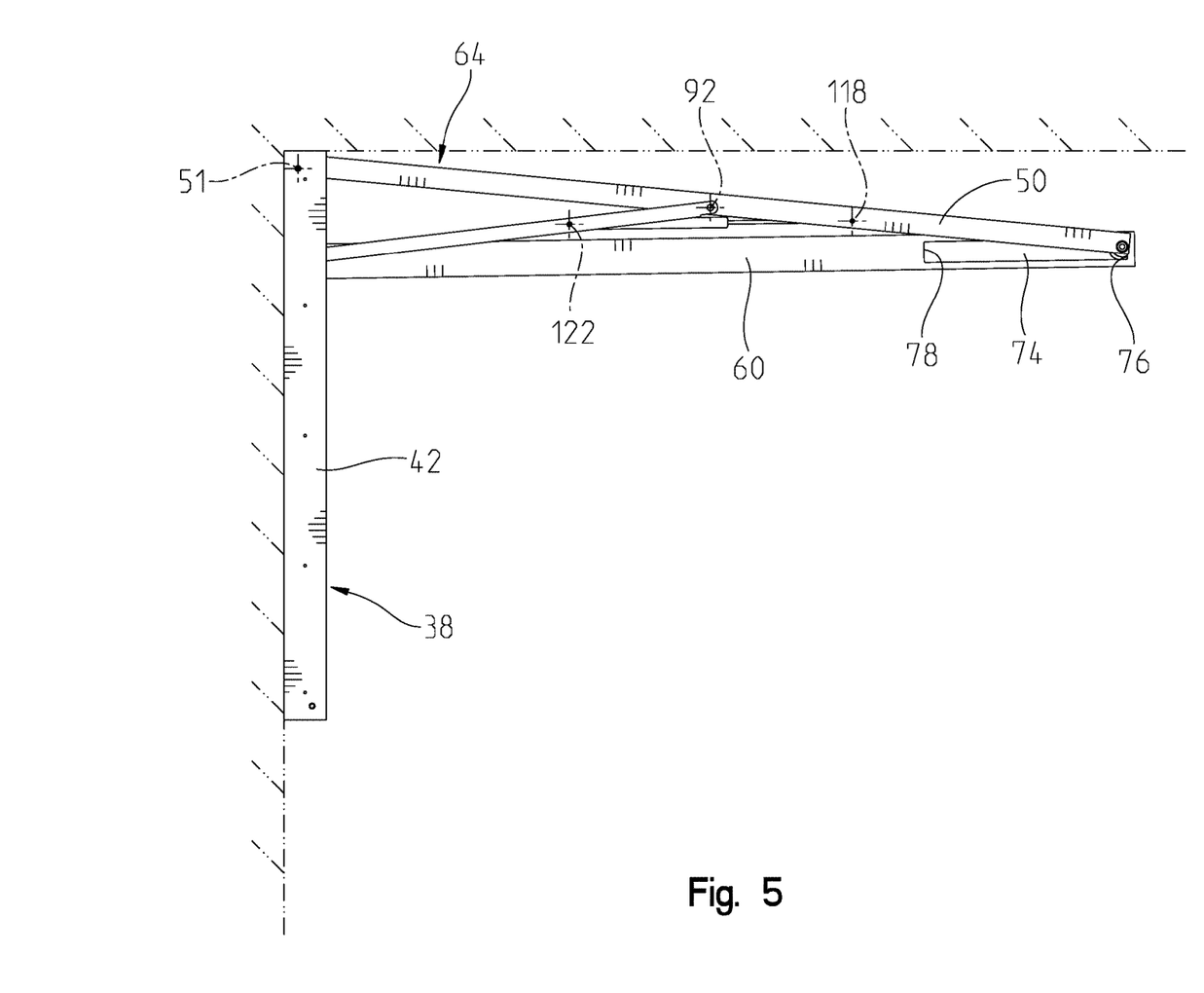
FIG. 5 is a side view of the lifting system shown in FIGS. 1-4 in the fully raised position.
Figure 6:
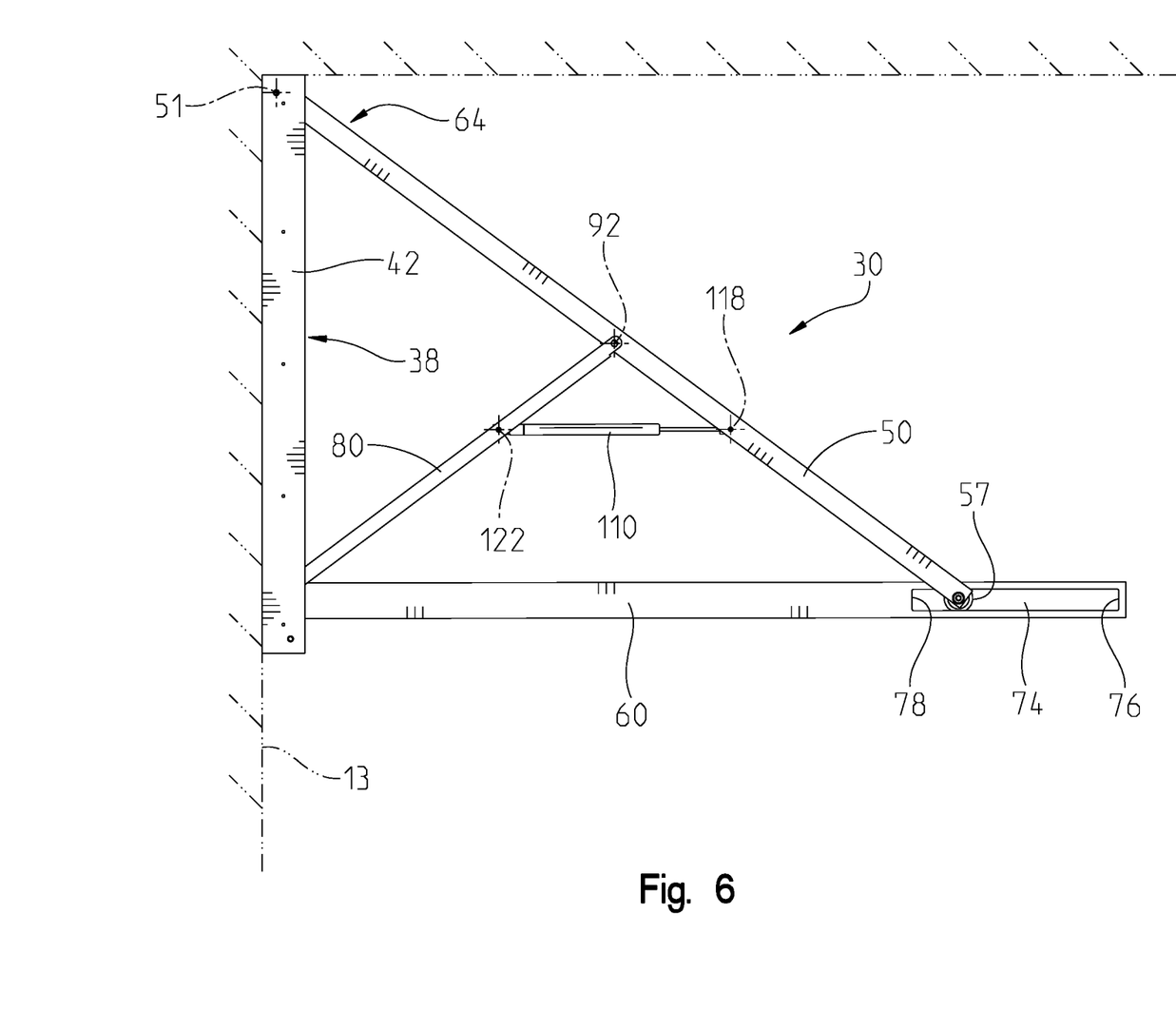
FIG. 6 is a side view of the lifting system shown in FIGS. 1-5 in the fully lowered position.
Figure 7:
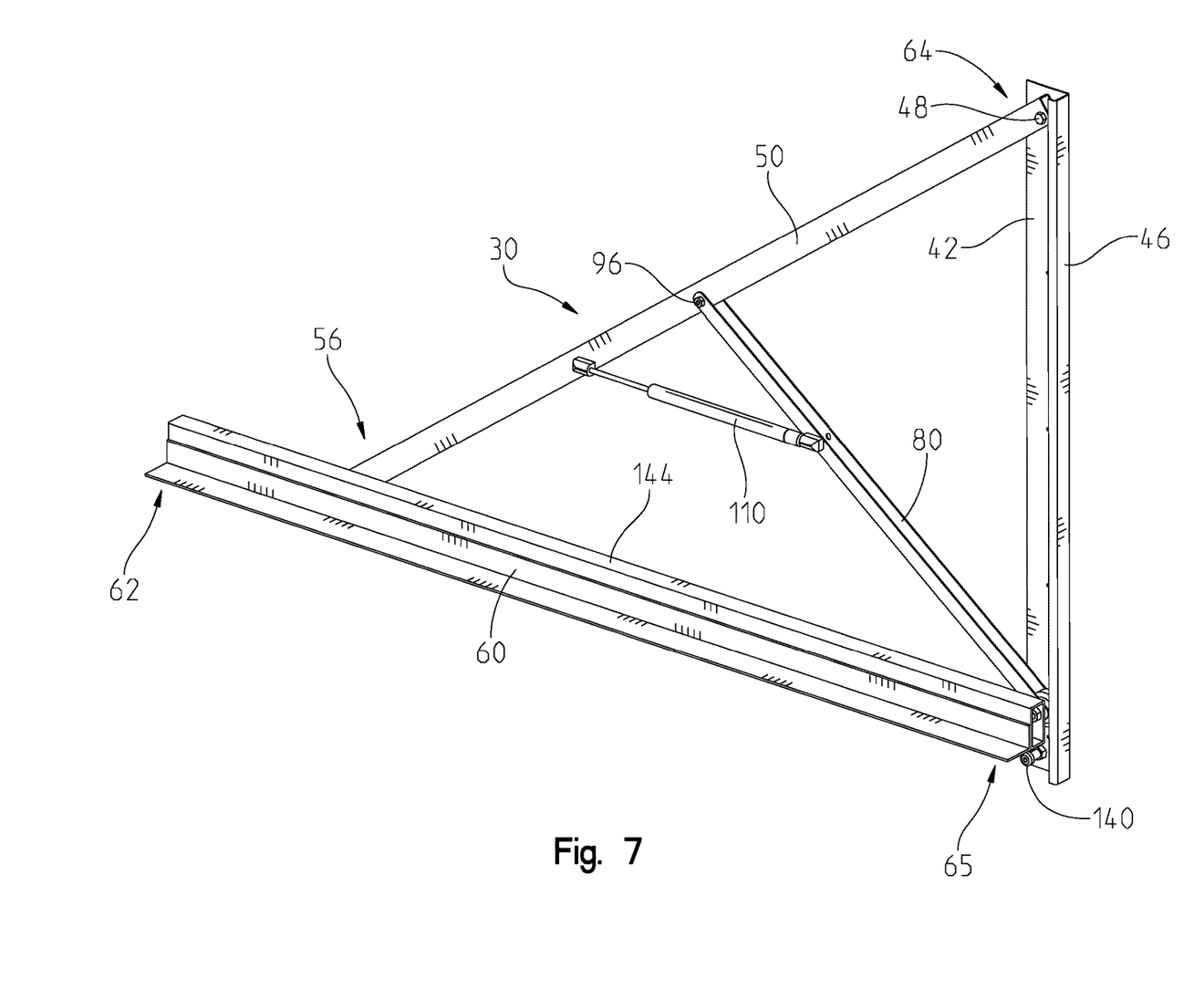
FIG. 7 is the left lifting assembly shown in FIGS. 1-6 in its fully lowered position as limited by the stop on the vertical support rail.
Figure 8:
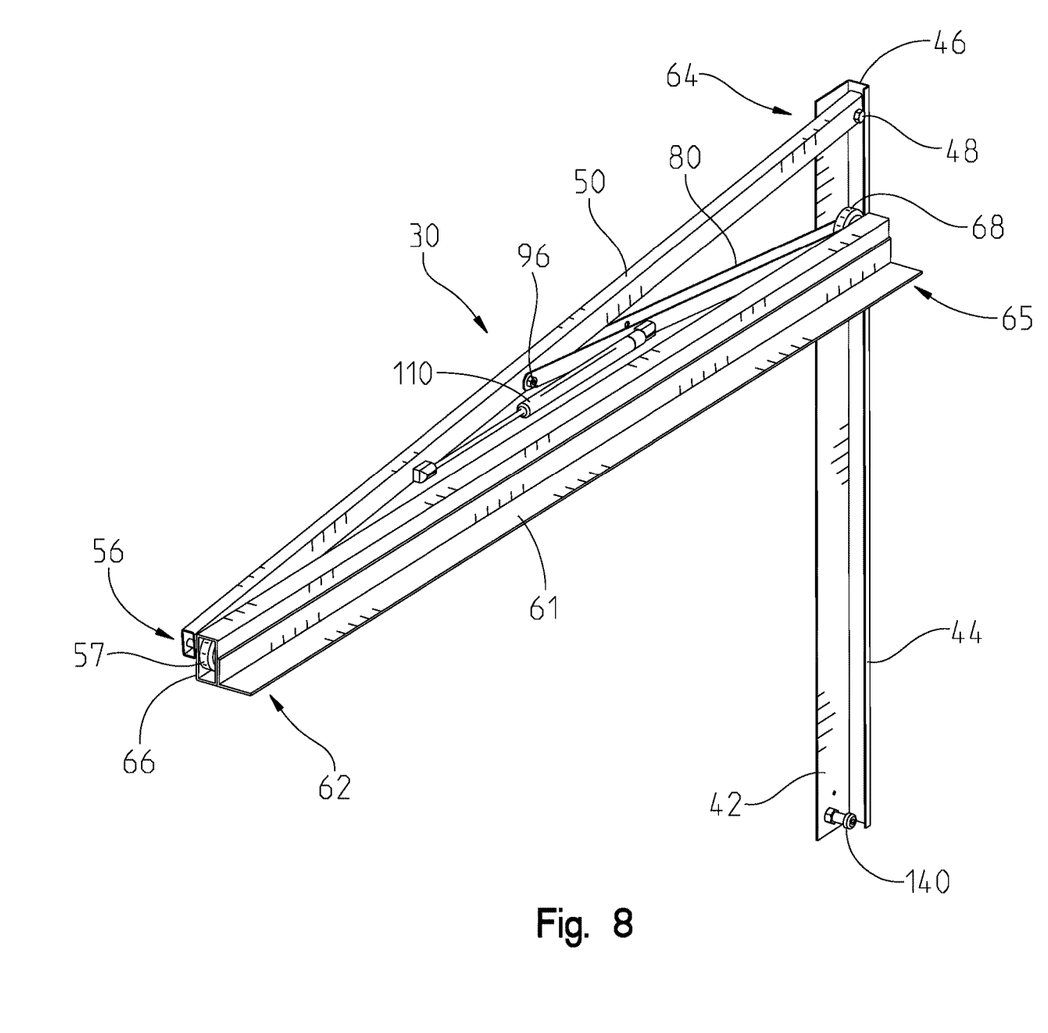
FIG. 8 is the left lifting assembly shown in FIG. 7 in its fully raised position.
Figure 9:
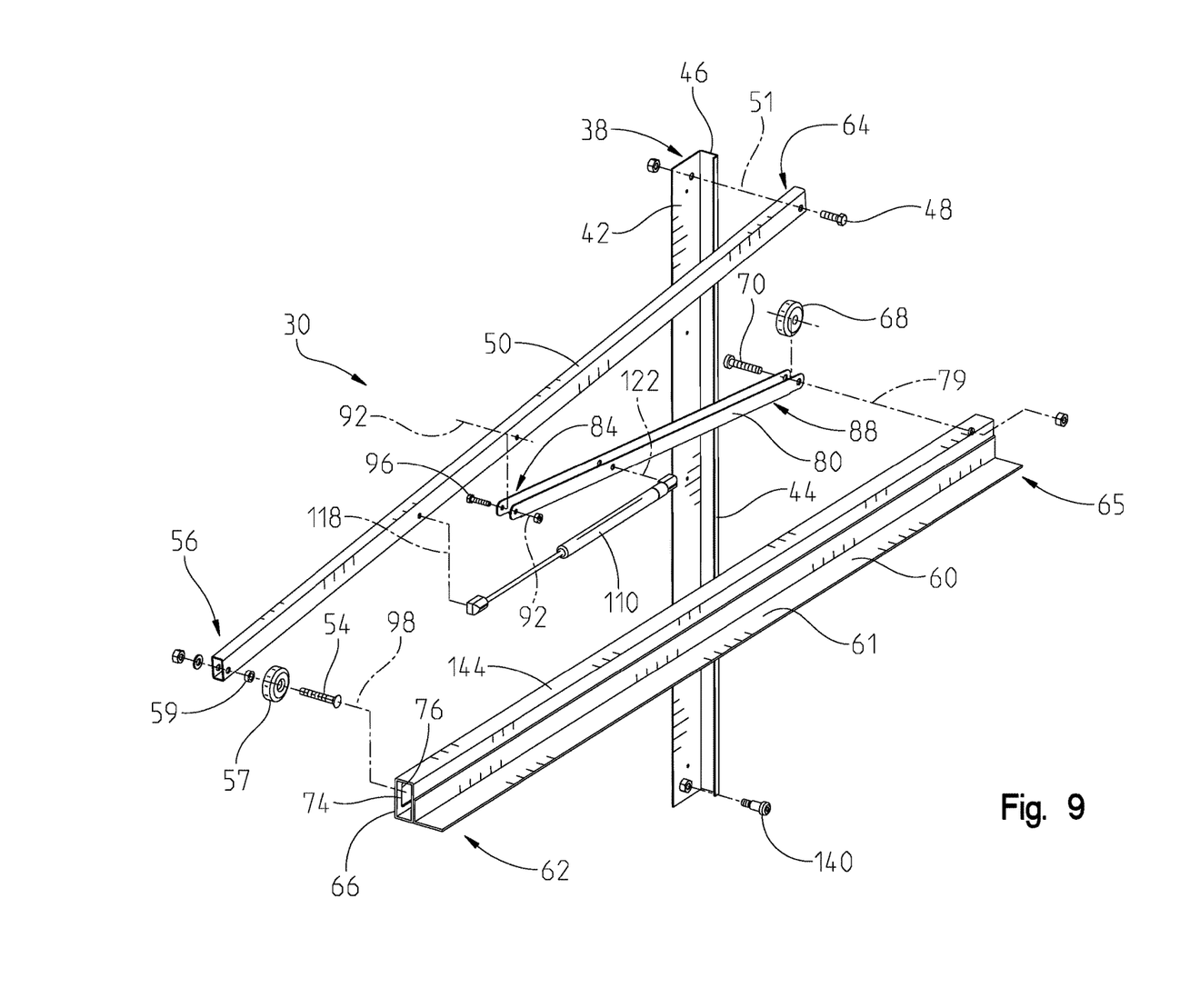
FIG. 9 is an exploded view of the lifting assembly shown in FIGS. 7 and 8.

The interaction of the components of the lifting system 10 of the present invention provide a lifting platform 11 that moves in a level and parallel fashion between a lowered position shown in FIG. 2 and a raised position in FIG. 3. In the lowered position shown in FIGS. 2, 4, and 7, the third pivot axis 79 is at is farthest location from the first pivot axis 51. The first pivot axis 51 serves as the pivotal connection between the control arm 50 and the vertical support rail 38; the third pivot axis 79 serves as the pivotal connection between the stabilizer arm 80 and the control arm 50. Both the first pivot axis 51 and the third pivot axis 79 are spaced the same distance from the back wall 46 throughout all points of movement between the lowered and raised position. In the fully lowered position, the bolt 54 fastening wheel 57 to the control arm 50 is at its closest to the innermost end surface 78 of the slot 74. It may be the case that the innermost end surface 78 can be used to limit the lowered position when the bolt 54 contacts the innermost end surface 78. In some cases, a stop 140 consisting of a bolt may be driven into the mounting flange 42 of the support rail, as shown in FIG. 7, to limit travel of each lifting assembly 30, 32 to a location that stops movement of each lifting assembly 30, 32 and consequently the bolt 54 before it may contact the innermost end surface 78 of the slot 74. Thus, the limit of downward travel may be limited by stop 140 or bolt 54 contacting the innermost end surface 78 of the slot 74 in each support beam 60. As the lifting platform 11 and associated lifting assemblies 30, 32 move toward their raised positions, the first and third pivot axes 51 and 79 move nearer each other. As that movement occurs, the distal end 56 of control arm 50 moves farther apart. The axis 98 about which wheel 57 moves is located at the same distance away from the top 144 of the support beam 60. Thus, as the lifting platform 11 and the associated lifting assemblies 30, 32 move toward their raised position, both the third pivot axis 79 and the axis 98 of the wheel 57 move in a parallel movement spreading farther apart as the lifting platform moves toward the raised position. As this movement occurs, the spring 110 extends because its pivotal connections 118 and 122 spread apart. The spring 110 biases the entire lifting platform toward its raised position by imparting force along its length. Although the spring 110 shown is a gas spring, it may be another type of extension spring that provides a biasing force to spread the distal end 57 of the control arm 50 apart from the third pivot axis 79 and support rail 38. The force of the spring 110 may be chosen on the amount of assist upwardly toward the raised position that is desired. For instance, the force of the spring 110 may be chosen so that the weight of the empty lifting platform 11 and the associated lifting assemblies 30, 32 require near zero force to move upwardly from the fully lowered position. It may also be desirable to provide more force than necessary to counteract just the weight of an empty lifting platform. Doing so could provide a lifting system 10 that requires near zero force to move upwardly from the lowered position when the weight of a particular object is placed upon it. When the lifting platform 11 is moved to its fully raised position, the bolt 54 holding wheel 57 into slot 74 may contact the outermost end surface 76 of the slot 74 and thereby limit upward travel of the lifting platform 11.

The present invention is not limited to the details above but may be modified within the scope of the following claims.

What is claimed is:

1. A lifting system comprising:
   a vertical support rail;
   a control arm having a proximal end and an oppositely located distal end, said control arm pivotally connected to said vertical support rail about a first pivot axis near said proximal end and said distal end of said control arm being spaced from said vertical support rail;
   a support beam connected to a lifting platform and said support beam having a distal end located relatively far from said vertical support rail and a proximal end located adjacent to said vertical support rail, said proximal end including an engaging member adjacent thereto for contacting said vertical support rail to maintain translational movement of said proximal end of said support beam along said vertical support rail, said engaging member of said support beam being held in contact to a back wall of said vertical support rail, and said control arm including an engaging member for engaging said support beam near said distal end of said control arm to maintain translational movement of said distal end of said control arm with respect to said support beam, said engaging member of said control arm riding within a slot within said support beam and said engaging member of said control arm movable between a first position located relatively far from said vertical support rail and a second position located relatively near to said vertical support rail;
   a stabilizer arm having a distal end and a proximal end, said distal end of said stabilizer arm pivotally connected to said control arm about a second pivot axis being between said proximal and said distal end of said control arm, and said proximal end of said stabilizer arm being pivotally connected to said support beam about a third pivot axis adjacent to said proximal end of said support beam, said engaging member adjacent to said proximal end of said support beam maintaining a constant distance between said third pivot axis and said vertical support rail;
   a spring having a biasing force toward extension of said spring, said spring pivotally connected to said control arm between said second pivot axis and said distal end thereof and said spring pivotally connected to said stabilizer arm;
said spring biasing said lifting platform toward said first pivot axis and biasing said engaging member of said control arm into said first position within said slot of said support beam.

2. The lifting system of claim 1, wherein said engaging member of said control arm includes a wheel rotating on an axle that is affixed to said control arm, said wheel being in rolling contact with said support beam and said axle contacting said slot in said first and second positions thereby restraining movement of said control arm and said lifting platform.

3. The lifting system of claim 2, wherein said spring is a strut type spring and is mounted substantially parallel to said support beam; said spring remaining substantially parallel to said support beam during travel of said support beam and said platform.

4. The lifting system of claim 2, wherein said engaging member of said stabilizer arm includes a wheel rotating on an axle.

5. The lifting system of claim 4, wherein said second pivot axis is located at the approximate midpoint of said control arm.

6. The lifting platform of claim 1, wherein said vertical support rail includes a stop for restraining movement of said support beam along said vertical support rail beyond said stop.

7. The lifting system of claim 1, further comprising:
   a second vertical support rail;
   a second control arm having a proximal end and an oppositely located distal end, said second control arm pivotally connected to said second vertical support rail about a first pivot axis near said proximal end and said distal of said control arm being spaced from said second vertical support rail;
   a second support beam connected to said lifting platform and said second support beam having a distal end located relatively far from said second vertical support rail and a proximal end and located adjacent to said second vertical support rail, said proximal end including an engaging member adjacent thereto for contacting said second vertical support rail to maintain translational movement of said proximal end of said second support beam along said second vertical support rail, and said second control arm including an engaging member for engaging said second support beam of said second control arm to maintain translational movement of said distal end of said second control arm with respect to said second support beam; said engaging member of said second control arm riding within a slot within said second support beam and said engaging member near said distal end of said second control arm movable between a first position located relatively far from said second vertical support rail and a second position located relatively near to said second vertical support rail;
   a second stabilizer arm having a distal end and a proximal end, said distal end of said second stabilizer arm pivotally connected to said second control arm about a second pivot axis being between said proximal and said distal end of said second control arm, and said proximal end of said second stabilizer arm being pivotally connected to said second support beam about a third pivot axis adjacent to said proximal end of said second support beam, said engaging member adjacent to said proximal end of said second support beam maintaining a constant distance between said third pivot axis and said second support rail;
a second spring having a biasing force toward extension of said second spring, said second spring pivotally connected to said second control arm between said second pivot axis and said distal end thereof and pivotally connected to said second stabilizer arm;
said second spring biasing said lifting platform toward said first pivot axis and said engaging member of said second control arm into said first position within said slot of said second support beam.

8. A lifting system comprising:
a pair of lifting assemblies being spaced apart, each of said lifting assemblies including:
a vertical support rail;
a control arm having a proximal end and an oppositely located distal end, said control arm pivotally connected to said vertical support rail about a first pivot axes near said proximal end and said distal end of said control arm being spaced from said vertical support rail;
a support beam connected to a lifting platform and said support beam having a distal end located relatively far from said vertical support rail and a proximal end located adjacent to said vertical support rail, said proximal end including an engaging member adjacent thereto for contacting said vertical support rail to maintain translational movement of said proximal end of said support beam along said vertical support rail, said engaging member of said support beam being held in contact to a back wall of said vertical support rail, and said control arm including an engaging member for engaging said support beam near said distal end of said control arm to maintain translational movement of said distal end of said control arm with respect to said support beam;
said engaging member of said control arm riding within a slot within said support beam and said engaging member of said control arm movable between a first position located relatively far from said vertical support rail and a second position located relatively near said vertical support rail;
a stabilizer arm having a distal end and a proximal end, said distal end of said stabilizer arm pivotally connected to said control arm about a second pivot axis being between said proximal and said distal end of said control arm, and said proximal end of said stabilizer arm being pivotally connected to said support beam about a third pivot axis adjacent to said proximal end of said support beam, said engaging member adjacent to said proximal end of said support beam maintaining a constant distance between said third pivot axis and said vertical support rail;
a spring having a biasing force toward extension of said spring, said spring pivotally connected to said control arm between said second pivot and said distal end thereof and said spring pivotally connected to said stabilizer arm;
said spring biasing said engaging member of said control arm into said first position within said slot of said support beam;
said lifting platform spanning between said support beams of said pair of lifting assemblies and said springs biasing said lifting platform toward said first pivot axes.

9. The lifting system of claim 8, wherein said engaging members of said control arms contain a wheel rotating on an axle that is affixed to said control arms, said wheel bring in rolling contact with said support beam and said axle contacting said slot in said first and second position thereby restraining movement of said control arm and said lifting platform.

10. The lifting system of claim 9, wherein said engaging members of said stabilizer arm includes a wheel rotating on an axle.

11. The lifting system of claim 10, wherein said second pivot axis is located at the approximate midpoint of said control arm.

12. The lifting system of claim 8, wherein said springs are a strut type spring and are mounted substantially parallel to corresponding said support beams, said springs remaining substantially parallel to said corresponding supports beam during travel of said support beams and said platform.

13. The lifting system of claim 1, wherein said vertical support rails include a stop for restraining movement of corresponding said support beams adjacent to corresponding said vertical support rails from movement beyond said stops.

14. A lifting system comprising:
a vertical support rail;
a control arm having a proximal end and an oppositely located distal end, said control arm pivotally connected to said vertical support rail about a first pivot axis near said proximal end and said distal end of said control arm being spaced from said vertical support rail;
a support beam connected to a lifting platform and said support beam having a distal end located relatively far from said vertical support rail and a proximal end located adjacent to said vertical support rail, said proximal end including an engaging member adjacent thereto for contacting said vertical support rail to maintain translational movement of said proximal end of said support beam along said vertical support rail, said engaging member of said support beam being held in contact to a back wall of said vertical support rail, and said control arm including an engaging member for engaging said support beam near said distal end of said control arm to maintain translational movement of said distal end of said control arm with respect to said support beam, said engaging member of said control arm riding within a slot within said support beam and said engaging member of said control arm movable between a first position located relatively far from said vertical support rail and a second position located relatively near to said vertical support rail;
a stabilizer arm having a distal end and a proximal end, said distal end of said stabilizer arm pivotally connected to said control arm about a second pivot axis being between said proximal and said distal end of said control arm, and said proximal end of said stabilizer arm being pivotally connected to said support beam about a third pivot axis adjacent to said proximal end of said support beam, said engaging member adjacent to said proximal end of said support beam maintaining a constant distance between said third pivot axis and said vertical support rail.

15. The lifting system of claim 14, including a spring having a biasing force toward extension of said spring, said spring pivotally connected to said control arm between said second pivot axis and said distal end thereof and said spring pivotally connected to said stabilizer arm.

16. The lifting system of claim 15, wherein said engaging member of said control arm includes a wheel rotating on an axle that is affixed to said control arm, said wheel being in rolling contact with said support beam and said axle contacting said slot in said first and second positions thereby restraining movement of said control arm and said lifting platform.

17. The lifting system of claim 16, wherein said engaging member of said stabilizer arm includes a wheel rotating on an axle.

18. The lifting system of claim 16, wherein said vertical support rail includes a stop for restraining movement of said support beam along said vertical support rail beyond said stop.

\* \* \* \* \*